United States Patent
Castinado (10) Patent No.: US 10,135,817 B2
(45) Date of Patent: Nov. 20, 2018

(54) ENHANCING AUTHENTICATION AND SOURCE OF PROOF THROUGH A DYNAMICALLY UPDATABLE BIOMETRICS DATABASE

(71) Applicant: BANK OF AMERICA CORPORATION, Charlotte, NC (US)

(72) Inventor: Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 120 days.

(21) Appl. No.: 15/082,476

(22) Filed: Mar. 28, 2016

(65) Prior Publication Data

US 2017/0279800 A1    Sep. 28, 2017

(51) Int. Cl.
G06F 7/04 (2006.01)
H04L 29/06 (2006.01)
G06F 21/32 (2013.01)

(52) U.S. Cl.
CPC .......... *H04L 63/0861* (2013.01); *G06F 21/32* (2013.01); *H04L 63/10* (2013.01)

(58) Field of Classification Search
CPC ...... H04L 63/0861; H04L 63/10; G06F 21/32
USPC ............................................................. 726/5
See application file for complete search history.

(56) References Cited

U.S. PATENT DOCUMENTS

| 5,717,923 A | 2/1998 | Dedrick |
| 5,761,648 A | 6/1998 | Golden et al. |
| 5,842,185 A | 11/1998 | Chancey et al. |
| 5,848,396 A | 12/1998 | Gerace |

(Continued)

FOREIGN PATENT DOCUMENTS

CN    104283967 A    1/2015

OTHER PUBLICATIONS

Friedman, Jack P., Dictionary of Business Terms, 2000, Barron's Educational Series, Inc., 3rd edition, 225.

(Continued)

*Primary Examiner* — Mohammad W Reza
(74) *Attorney, Agent, or Firm* — Michael A. Springs; Moore & Van Allen PLLC; James C. Edwards (57) ABSTRACT

The present invention provides for biometric authentication of users using current, updatable biometric data/standards. In this regard, the present invention provides for creation of a registry of authentication information that dynamically, over time, receives biometric authentication-related information (e.g., photographs, voice samples, fingerprints, signatures and the like) from diverse devices configured to capture/sense such. The devices may be devices associated with the user, such as mobile communication devices, devices locate in the user's residence or the like, or the devices may be public devices, such as security cameras, point-of-sale devices or the like, which are configured to capture and electronically communicate biometric authentication-related information. In response to invoking a biometric authentication application and receiving a user's biometric credentials/identifier, the registry is accessed so that a comparison may be made between the user's current biometric credentials and the biometric data stored within the registry.

16 Claims, 3 Drawing Sheets

(56) References Cited

U.S. PATENT DOCUMENTS

| | | |
|---|---|---|
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,853,291 B1 | 2/2005 | Aisa |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,301,558 B2 | 10/2012 | Marshall et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,964,113 B2 | 2/2015 | Kannermark et al. |
| 8,984,113 B2 | 3/2015 | Li et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,411,982 B1 | 8/2016 | Dippenaar et al. |
| 9,743,272 B1 | 8/2017 | Ogrinz et al. |
| 9,775,131 B2 | 9/2017 | Winand et al. |
| 9,843,624 B1 | 12/2017 | Taaghol et al. |
| 9,874,923 B1 | 1/2018 | Brown et al. |
| 9,946,571 B1 | 4/2018 | Brown et al. |
| 2002/0032626 A1 | 3/2002 | DeWolf et al. |
| 2002/0049624 A1 | 4/2002 | Ravels, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0039053 A1* | 2/2005 | Walia .................. G06F 21/316 726/4 |
| 2005/0075975 A1 | 4/2005 | Rosner et al. |
| 2005/0171845 A1 | 8/2005 | Hallman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1* | 4/2007 | Ritter .................... G06F 21/32 382/115 |
| 2007/0127470 A1 | 6/2007 | Gaedeken et al. |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |

(56) References Cited

U.S. PATENT DOCUMENTS

| | | |
|---|---|---|
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2011/0040785 A1 | 2/2011 | Steenberg et al. |
| 2011/0087547 A1 | 4/2011 | Amaro et al. |
| 2011/0182280 A1 | 7/2011 | Charbit et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0190386 A1 | 7/2012 | Anderson |
| 2012/0290230 A1 | 11/2012 | Berges Gonzalez et al. |
| 2013/0006813 A1 | 1/2013 | Carlin et al. |
| 2013/0046626 A1 | 2/2013 | Grigg et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1 | 7/2013 | Seibert et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1* | 4/2014 | Buer ............... H04L 9/3231 713/156 |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0221039 A1 | 8/2015 | Johansson |
| 2015/0227406 A1 | 8/2015 | Jan et al. |
| 2015/0293574 A1 | 10/2015 | Ehsan et al. |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1* | 12/2015 | Deutschmann ..... H04L 63/0861 713/186 |
| 2016/0065628 A1 | 3/2016 | Guo et al. |
| 2016/0071334 A1 | 3/2016 | Johnson et al. |
| 2016/0087933 A1 | 3/2016 | Johnson et al. |
| 2016/0110811 A1 | 4/2016 | Siu et al. |
| 2016/0132832 A1 | 5/2016 | Pinkovezky et al. |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1* | 9/2016 | Malachi ................. H04L 63/10 |
| 2016/0295410 A1 | 10/2016 | Gupta et al. |
| 2016/0300201 A1 | 10/2016 | Li et al. |
| 2016/0337869 A1 | 11/2016 | Dai et al. |
| 2016/0342982 A1 | 11/2016 | Thomas et al. |
| 2016/0343078 A1 | 11/2016 | Vaidyanathan et al. |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1 | 2/2017 | Ford et al. |
| 2017/0061442 A1 | 3/2017 | Barlow et al. |
| 2017/0076408 A1 | 3/2017 | D'Souza et al. |
| 2017/0124642 A1 | 5/2017 | Barnett et al. |
| 2017/0171513 A1 | 6/2017 | Nakamura |
| 2017/0178186 A1 | 6/2017 | Craft |
| 2017/0208079 A1 | 7/2017 | Cammarota et al. |
| 2017/0208139 A1 | 7/2017 | Li et al. |
| 2017/0228773 A1 | 8/2017 | Takayama |
| 2017/0235454 A1 | 8/2017 | Selfridge et al. |
| 2017/0244618 A1 | 8/2017 | DeLuca et al. |
| 2017/0278133 A1 | 9/2017 | Corrado et al. |
| 2017/0280459 A1 | 9/2017 | Ogrinz |
| 2017/0302669 A1 | 10/2017 | Chen et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |
| 2017/0366422 A1 | 12/2017 | Castinado et al. |
| 2017/0374583 A1 | 12/2017 | Ogrinz et al. |
| 2018/0007131 A1 | 1/2018 | Cohn et al. |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

* cited by examiner

ENHANCING AUTHENTICATION AND SOURCE OF PROOF THROUGH A DYNAMICALLY UPDATABLE BIOMETRICS DATABASE

FIELD

In general, embodiments of the invention relate to electronic authentication of a user, more specifically, employing a dynamically updatable biometrics database/registry to authenticate users.

BACKGROUND

Biometric data has recently been used as means to electronically authenticate individuals. For example, facial recognition, voice recognition, fingerprint/handprint, signature recognition techniques have been implemented to identify individuals. Such authentication/identification is required in order to confirm the identity of an individual, such as a computer network environment, in which the individual and the authorizing entity are not mutually present at the same physical location and/or the authorizing entity is computerized.

However, one problem with biometric data is that it tends to change over time. For example, an individual's appearance has a tendency to change over time resulting in changes in their facial features and the like. Similarly, an individual's voice may change over time due to various reasons. In this regard, a young adult maturing into an adult experiences changes in facial features, voice features and the like. An individual may gain or lose weight, a male may gain or lose facial hair and the like. Other biometric data, such as a signature tends to be stylistic and may change based on individual's desire or due to the input-mechanism requiring the signature. For example, an individual's "normal" signature may vary significantly from a signature made at a point-of-sale device; especially in those instances in which the electronic input mechanism has an abbreviated display. In those instances in which the biometric data changes, it may be difficult and, in some instances, impossible to authenticate the individual.

Moreover, authentication using biometric data has, heretofore, been conducted in a static, unitary form; meaning biometric credentials are received from a user (e.g., captured by a camera, microphone, touchpad or the like) and compared to a single sample (e.g. a photograph, a voice sample, a finger/handprint, a signature on file or the like). Such, authentication means not only does not account for changes over time in biometric data, but also does not account for patterns in biometric data that occur over time (for example, a pattern of an appearance change, a pattern of a change in a user's signature or the like).

Therefore, a need exists to develop a systems, apparatus and the like for authentication means that take into account the fact that biometric data may change over time or that patterns in biometric data may occur over time. In this regard, desired systems, apparatus and the like should be capable authenticating a user based on their current biometrics regardless of how long ago the original stored biometric data was recorded. Moreover, the desired systems, apparatus and the like should be capable of identifying patterns or trends in a user's biometric data that occur over time and use such patterns and trends as a means for authenticating the user.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for biometric authentication of users using current biometric data/standards. In this regard, the present invention provides for creation of a registry of authentication information that dynamically, over time, receives biometric authentication-related information (e.g., photographs, voice samples, fingerprints, signatures, heart rate, body temperature and the like) from diverse devices configured to capture/sense such. The devices may be devices associated with the user, such as mobile communication devices, wearable devices (fitness tracker, smart watch or the like) or the devices may be public devices, such as security cameras, point-of-sale devices or the like, which are configured to capture and electronically communicate such data. In response to invoking a biometric authentication application and receiving a user's biometric credentials/identifier, the registry is accessed so that a comparison may be made between the user's current biometric credentials and the data stored within the registry.

As such by relying on recently captured biometric data and/or a database of biometric data acquired over time the present invention is able to authenticate biometric credentials which may have changed over time or differ depending on source, such as input mechanism, sensor or the like. In this regard, more accurate biometric authentication is made possible and, in some instances, provides for biometric authentication in instances in which biometric authentication would otherwise be difficult, if not, impossible.

In other embodiments of the invention, the historical biometric user profile stored in the registry is used to determine biometric patterns, such as changes in biometric data over time, a biometric pattern as to type and/or source (e.g., a consistent pattern of a user's signature is identified across a specific input mechanism, such as a touch screen display or point-of-sale device) or the like. Identification of patterns provides further means of biometric authentication and/or additional assurance that the biometric authentication is accurate.

A system for authenticating a user defines first embodiments of the invention. The system includes a first computing platform having a first memory and at least one first processor in communication with the first memory. The system further includes a registry of authentication information stored in the first memory and configured to implement the first processor to receive, on an ongoing basis, from a plurality of disparate devices having one or more sensors that capture biometric data, authentication-related information related to a plurality of users. The authentication-related information includes different sources and types of biometric data associated with each of the users. The registry is further configured to store the authentication-related information associated with each of the users in user-specific profiles. The user-specific profiles form, over time, a historical record of each user's biometric data categorized by the sources and the types of the biometric data.

The system additionally includes a second computing platform having a second memory and at least one second processor in communication with the second memory. Moreover, the system includes an authentication module that is stored in the second memory and executable by the second processor. The authentication module is configured to receive, from a user, an authentication credential that comprises at least one biometric identifier of the user, access, electronically, a user-specific profile associated with the user, which is stored in the registry of authentication of data, compare the at least one biometric identifier to the biometric data in the user-specific profile, and, based on the comparison, determine that the user is authenticated.

In specific embodiments of the system, the types of biometric data include one or more of signature data, facial characteristic data, fingerprint or hand characteristic data, voice characteristic data, heart rate data, body temperature data and the like and the source of the biometric data includes one or more of a sensor-type that captured the biometric data or an input mechanism-type that received the biometric data input.

In other specific embodiments of the system, the authentication module is further configured to receive, from the user, the authentication credential that comprises at least one biometric identifier of the user and identifies a source and a type of the biometric identifier, and compare the at least one biometric identifier to the biometric data in the user-specific profile. The comparison includes comparing the source and the type of the biometric identifier to the source and type of the biometric data in the user-specific profile.

In still further specific embodiments of the system, the authentication module is further configured to compare the biometric identifier to the biometric data in the user-specific profile in chronological order from a most recently received biometric data.

Moreover, in additional specific embodiments the system includes a biometric pattern determination module stored in a third memory and executable by a third processor. The biometric pattern determination module is configured to determine one or more patterns associated with the biometric data stored in a user profile within the registry of authentication information and store the one or more patterns in the user-specific profile with the registry. The patterns may identify the same biometric data based on source (e.g., same signature dependent type of input mechanism). In such embodiments of the system, the authentication module may be further configured to receive, from the user, the authentication credential that comprises at least one biometric pattern identifier, and compare the biometric pattern identifier to the one or more patterns stored in the user-specific profile.

In still further embodiments the system includes a biometric data verification module that is stored in third memory, executable by a third processor and configured to, in response to the registry receiving the authentication-related information, verify that the authentication-related information is related to one of the plurality of users. In such embodiments of the system, the biometric data verification module is further configured to verify that the authentication-related information is related to one of the plurality of users by at least one of (i) comparing a device from which the authentication-related information was received to a registering listing of one or more devices associated with the user (i.e., verified devices), or (ii) heuristic comparison of the biometric data comprising the authentication-related information to known biometric data associated with the user. In further such embodiments of the system, the registry of authentication is further configured to, upon verification by the verification module, store the store the verified authentication-related information as a block chain within the user-specific profile associated with the user.

Additionally, in further specific embodiments of the system, the authentication module is further configured to receive the authentication credential that comprises at least one biometric identifier of the user, in response to one of (i) a predetermined period of time has elapsed since the user has provided authentication credential for an application requiring authentication credentials in a form of a username and password, or (ii) misappropriation has recently occurred or is known to be associated with an application requiring authentication credentials.

An apparatus for authenticating a user defines second embodiments of the invention. The apparatus includes a computer platform having a memory and at least one processor in communication with the memory. The apparatus further includes an authentication module that is stored in the memory and executable by the processor. The authentication module is configured to receive, from a user, an authentication credential that comprises at least one biometric identifier of the user and access, electronically, a registry of authentication of data. The registry of authentication information is configured to (i) receive, on an ongoing basis, from a plurality of disparate devices having one or more sensors that capture biometric data, authentication-related information related to a plurality of users, and (ii) stores the authentication-related information associated with each of the users in user-specific profiles. The authentication-related information includes different sources and types of biometric data associated with each of the users. The user-specific profiles form, over time, a historical record of each user's biometric data categorized by the sources and the types of the biometric data. The authentication module is further configured to compare the at least one biometric identifier to the biometric data in the user-specific profile, and based on the comparison, determine that the user is authenticated.

In specific embodiments of the apparatus, the authentication module is further configured to receive, from the user, the authentication credential that comprises at least one biometric identifier of the user and identifies a form and a type of the biometric identifier, and compare the at least one biometric identifier to the biometric data in the user-specific profile. The comparison includes comparing the form and the type of the biometric identifier to the form and type of the biometric data in the user-specific profile.

In other specific embodiments of the apparatus, the authentication module is further configured to compare the at least one biometric identifier to the biometric data in the user-specific profile in chronological order from a most recently received biometric data.

In still further specific embodiments of the apparatus, the authentication module is further configured to receive, from the user, the authentication credential that comprises at least one biometric identifier of the user, which defines a biometric pattern identifier, and compare the at least one biometric pattern identifier to the biometric data in the user-specific profile. The comparison includes comparing the biometric pattern identifier to the one or more determined patterns stored in the user-specific profile.

A computer program product including a non-transitory computer-readable medium defines third embodiments of thee invention. The computer-readable medium includes a first set of codes for causing a computer to receive, on an ongoing basis, from a plurality of disparate devices having one or more sensors that capture biometric data, authentication-related information related to a plurality of users, wherein the authentication-related information includes different sources and types of biometric data associated with each of the users. The computer-readable medium additionally includes a second set of codes for causing a computer to store the authentication-related information associated with each of the users in user-specific profiles. The user-specific profiles form, over time, a historical record of each user's biometric data categorized by the sources and the types of the biometric data. In addition, the computer-readable medium includes a third set of codes for causing a computer to receive, from a user, an authentication credential that comprises at least one biometric identifier of the user. Additionally, the computer-readable medium includes a fourth set of codes for causing a computer to access, electronically, one of the user-specific profiles associated with the user to compare the at least one biometric identifier to the biometric data in the user-specific profile, and, based on the comparison, determine that the user is authenticated.

Thus, systems, apparatus, methods, and computer program products herein described in detail below provide for biometric authentication of users using current, updatable biometric data/standards. In this regard, the present invention provides for creation of a registry of authentication information that dynamically, over time, receives biometric authentication-related information (e.g., photographs, voice samples, fingerprints, signatures, heart rates, body temperatures and the like) from diverse devices configured to capture/sense such. The devices may be devices associated with the user, such as mobile communication devices, devices locate in the user's residence or the like, or the devices may be public devices, such as security cameras, point-of-sale devices or the like, which are configured to capture and electronically communicate biometric authentication-related information. In response to invoking a biometric authentication application and receiving a user's biometric credentials/identifier, the registry is accessed so that a comparison may be made between the user's current biometric credentials and the biometric data stored within the registry. By relying on recently captured biometric data and/or a database of biometric data captured over time, the present invention is able to authenticate biometric credentials which may have changed over time or differ depending on form, such as input mechanism, sensor or the like. As such, more accurate biometric authentication is made possible and, in some instances, provides for biometric authentication in instances in which biometric authentication would otherwise be difficult, if not, impossible.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for biometric authentication of users using current biometric data/standards. In this regard, the present invention provides for creation of a registry of authentication information that dynamically, over time, receives biometric authentication-related information (e.g., photographs, voice samples, fingerprints, signatures, heart rates and the like) from diverse devices configured to capture/sense such. The devices may be devices associated with the user, such as mobile communication devices, wearable devices or devices within a user's residence or the like, or the devices may be public devices, such as security cameras, point-of-sale devices or the like, which are configured to capture and electronically communicate such data. In response to invoking a biometric authentication application and receiving a user's biometric credentials/identifier, the registry is accessed so that a comparison may be made between the user's current biometric credentials and the biometric data stored within the registry.

As such by relying on recently captured biometric data or a database of biometric data captured over time the present invention is able to authenticate biometric credentials which may have changed over time or differ depending on source, such as input mechanism, sensor or the like. In this regard, more accurate biometric authentication is made possible and, in some instances, provides for biometric authentication in instances in which biometric authentication would otherwise be difficult, if not, impossible.

In other embodiments of the invention, the historical biometric user profile stored in the registry is used to determine biometric patterns, such as changes in biometric data over time, a biometric pattern as to type and/or source (e.g., a consistent pattern of a user's signature is identified across a specific input mechanism, such as a touch screen display or point-of-sale device) or the like. Identification of patterns provides further means of biometric authentication and/or additional assurance that the biometric authentication is accurate.

Figure 1:
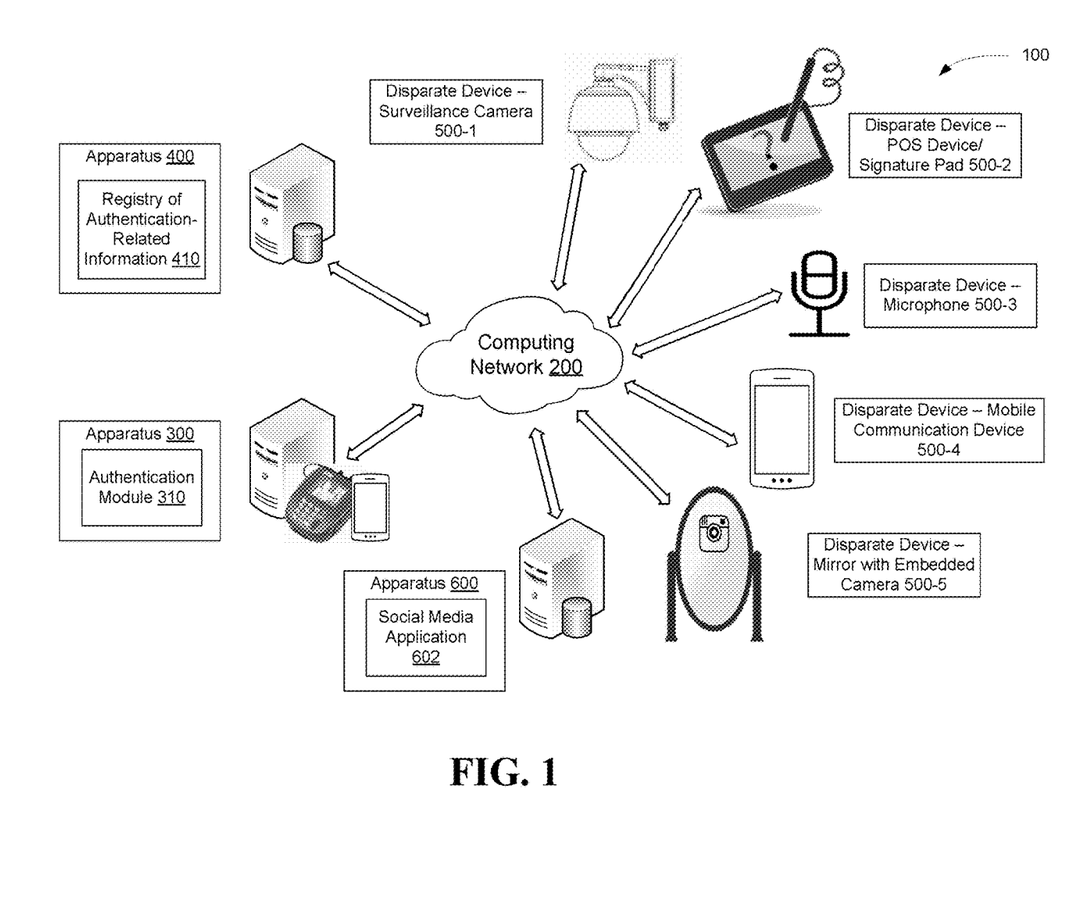
FIG. 1 provides a schematic diagram of an exemplary system for user authentication using a registry of biometric authentication information, in accordance with embodiments of the present invention.

Referring to FIG. 1, a schematic diagram is provided of a system 100 for biometric authentication of users, in accordance with embodiments of the present invention. The system 100 is implemented in a distributed computing environment via computing network 200, which may include the Internet, as well as, one or more intranets. System 100 includes apparatus 400 which stores registry of authentication information 308. The registry of authentication-related information 410 is configured to receive, on an ongoing basis, from disparate devices 500 and/or social media applications 602, authentication-related information associated with users. The authentication-related information includes different sources (e.g., input mechanisms) and types of biometric data.

The disparate devices 500 include any device having one or more sensors that capture biometric data. Biometric data is any data captured/collected through a biometric (i.e., physical feature or movement(s)) process and may include, but is not limited to, facial features, handprints/fingerprints, voice features, signatures, gestures/movement patterns, heart rate, body temperature and the like. The disparate devices additionally having Internet connectivity, typically wireless Internet connectivity and, thus are considered devices within an Internet-of-Things (IoT) network environment. In the illustrated example of FIG. 1 the disparate devices may be both public devices and private devices (i.e., devices in the possession or control of a user).

For example, disparate devices 500 may include public devices, such as, a surveillance camera 500-1, which is configured to capture images of users; a point-of-sale device/signature pad device 500-2, which is configured to capture to capture signatures of users; a microphone 500-3, which is configured to capture voice samples of users and the like. In one illustrated example, the surveillance camera 500-1 and/or microphone 500-3 (e.g., access entry microphone) may be located within a place of business or residence (e.g., apartment building) associated with a user, such that the surveillance camera 500-1 and/or microphone 500-3 are capable of capturing frequent (e.g., daily, weekly or the like) images and/or voice samples of a user and communicating the captured images and voice samples to the registry of authentication-related information 410. Additionally, disparate devices include private devices, such as, a mobile communication device 500-4 or wearable devices (not shown ion FIG. 1), which may be configured to capture images, voice samples, fingerprints, gestures/input patterns, heart rates, body temperatures and the like; and objects embedded with sensors, such a mirror with an embedded camera 500-5 located in the user's residence.

Further, FIG. 1 depicts apparatus 600, such as an Internet-based server, which executes social media application 602, which is configured to upload images, videos, voice files and the like of users and subsequently communicate the images, videos and/or voice files to the registry of authentication-related information 410. The communication of such social media data may be at the discretion of the user, based on the user registering for the registry service and allowing access to social media-related data.

The registry of authentication-related information 410 is further configured to store authentication-related information, specifically biometric data, in user-specific profiles, which, by constantly receiving authentication-related information, specifically biometric data, from the disparate devices 500 and/or social media applications 602, forms, over time, a historic record of each user's biometric data categorized by the source (e.g., input mechanism) and type (e.g., image, voice, signature, fingerprint, gesture/pattern and the like) of the biometric data.

In specific embodiments of the invention, users will register or otherwise agree to participate in the registry of authentication-related information, based on the knowledge that the more accurate the biometric authentication process is, the more benefit is afforded to the user in the form of stronger authentication protection. In such embodiments of the invention, the registered user may register their particular personal devices, such as mobile communication device 500-4, mirror with embedded camera 500-5 and the like and/or social media application(s) such that registry of the devices and/or social media device can readily provide for the registry 410 to determine which user is associated with the biometric data communicated from such devices and/or sites, and store such data in the user's associated user profile. Conversely, authentication-related information communicated from public devices, such as surveillance camera 500-1, POS device/signature pad 500-2, microphone/voice capturing device 500-3 or the like or social media may be identified as being associated with the user by the disparate device, by an intermediary network-based application or by the registry of authentication-related information 410. Such identification may occur based on heuristic comparison to known, verified biometric data or the like.

System 100 additionally includes apparatus 300, which stores authentication module 310. Apparatus 300 may comprise one or more devices working individually or in unison to implement the authentication module 310. For example, the apparatus may include one or more of a network-based server, a mobile communication device, a point-of-sale (POS) device or the like. The authentication module 310 is configured to receive, from a user, authentication credentials that include at least one biometric identifier and access, electronically, the user-specific profile stored in the registry of authentication-related information 410. The authentication module 310 is further configured to compare the biometric identifier(s) to the biometric data stored in the user-specific profile to determine, based on the comparison, that the user is (or is not) authenticated.

Figure 2:
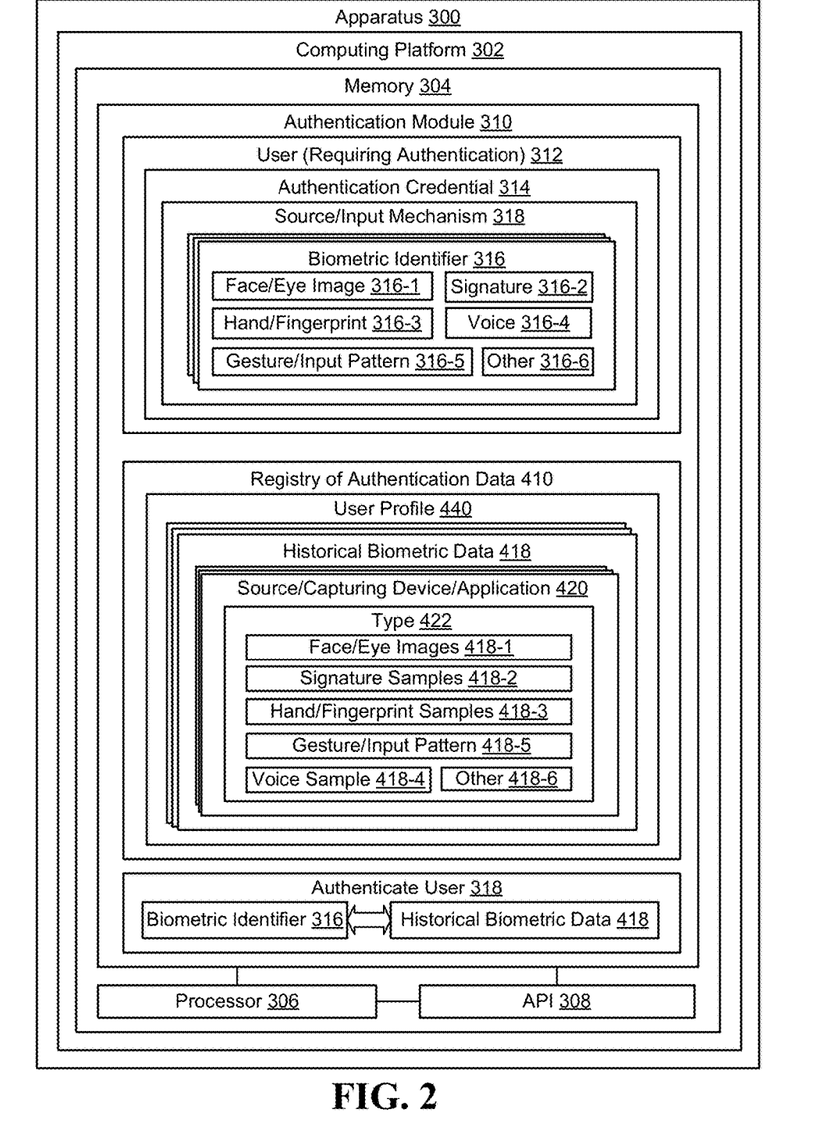
FIG. 2 provides a block diagram of an apparatus for user authentication, in accordance with embodiments of the present invention.

Referring to FIG. 2 a block diagram is presented of the apparatus 300, which is configured for biometric authentication of a user, in accordance with embodiments of the present invention. In addition to providing greater detail, FIG. 2 highlights various alternate embodiments of the invention. The apparatus 300 may include one or more of any type of computing device, such as a mobile communication device, a server, a POS device or the like. The present apparatus and methods can accordingly be performed on any form of one or more computing devices.

The apparatus 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") 308 that interfaces with any resident programs, such as authentication module 310 and routines, sub-modules associated therewith or the like stored in the memory 304 of the apparatus 300.

Processor 306 includes various processing subsystems (not shown in FIG. 2) embodied in hardware, firmware, software, and combinations thereof, that enable the functionality of apparatus 300 and the operability of the apparatus on a network. For example, processing subsystems allow for initiating and maintaining communications and exchanging data with other networked devices, such as those apparatus, databases and repositories shown in FIG. 1. For the disclosed aspects, processing subsystems of processor 306 may include any subsystem used in conjunction with authentication module 310 and related algorithms, sub-algorithms, modules, sub-modules thereof.

Computer platform 302 may additionally include communications module (not shown in FIG. 2) embodied in hardware, firmware, software, and combinations thereof, that enables communications among the various components of the apparatus 300, as well as between the other networked devices. Thus, communication module may include the requisite hardware, firmware, software and/or combinations thereof for establishing and maintaining a network communication connection.

The memory 304 of apparatus 300 stores authentication module, which is configured to authenticate a user based, at least on, biometric data, in accordance with embodiments of the invention. The module 310 is configured to initiate the authentication by receiving, from a user 312 requiring authentication, an authentication credential 314 that includes at least one biometric identifier 316. In specific embodiments of the invention, the biometric identifier 316 may include one or more of a face/eye image 316-1, a signature 316-2, a handprint/fingerprint 316-3, a voice sample 316-4, a gesture/input pattern 316-5 or any other 316-6 physical or biometric feature or movement/pattern of movements associated with or performed by the user 312.

In specific embodiments of the invention, the user may be unaware that the biometric identifier 316 is being captured and is part of an authentication process. For example, a biometric identifier 316, in the form of one or more of a face image 316-1, voice sample 316-4, gesture/input pattern 316-5 may be covertly captured and, if the biometric identifier successfully authenticates the user 316, the user forego an overt authentication action (e.g., user input of a username/passcode, signature or the like) or may be required to provide less authentication credentials than would otherwise be required (e.g., user input of a username but no password, or the like).

In other embodiments of the invention, the authentication module 310 may be configured such that the authentication credentials 314 required of the user 312 include biometric identifier(s) only if a predetermined condition exists. Such predetermined conditions may include, but are not limited to, (i) unable to authenticate the user based on conventional authentication credentials (e.g., incorrect/expired username/passcode or the like), (ii) previous instances of misappropriation or the like associated with the user or underlying reason for the authentication, (iii) user has not been authenticated by the module and/or by the underlying reason for the authentication within a predetermined time period or the like. In instances in which the predetermined conditions have been met, the biometric identifier(s) 316 may be covertly or overly captured and communicated to the authentication module 312.

In specific embodiments of the invention, authentication credentials 314 may include the source/input mechanism 318 associated with the biometric identifier 316. The source/input mechanism may include the type of source/input mechanism or any other characteristics associated with the source of the biometric data. In certain instances, the biometric data may differ depending on the source (e.g., sensor)/input mechanism. For example, a face/eye image may differ depending on the quality of the image capturing devices (e.g., number of pixels or the like), a signature may differ depending on what type of signature pad is used and/or stylus (e.g., signatures made with an abbreviated sized signature pad and/or using a finger as the stylus result in signatures that differ significantly from other electronically-captured signatures).

In response to receiving, the biometric identifier(s) 316, the authentication module 310 is configured to access the registry of authentication information 410 (shown in FIGS. 1 and 3) and, specifically, the user profile 440 associated with the user 312 requesting authentication. As previously discussed the user profile 440 includes a historical listing of biometric data 418 associated with a user. In specific embodiments of the invention the user profile 440 is categorized according to source 420 (i.e., input mechanism/disparate device/social media application) and type 422 of biometric data. The types of biometric data may include, but are not limited to, face/eye images 418-1; signature samples 418-2; handprint/fingerprint data/images 418-3; voice samples 418-3; gesture/input patterns 418-5; and any other known or future known biometric data type that may be used to authenticate a user.

The authentication module 310 is further configured to compare the biometric identifier 316 to the historical biometric data 418 to determine that the user is (or is not) authenticated 318. In specific embodiments of the invention, the biometric identifier 316 is applied/compared to the historical biometric data 418 in chronological order with the most recently received biometric data being applied first. In other instances, in which the source/input mechanism 318 of the biometric identifier 316 is known and relevant to the comparison/determination, the biometric identifier 316 is first applied to those listings in the historical data 418 having a same or similar source/capturing device 420. For example, if the biometric is a signature and the source of the signature is known, the signature will be applied/compared to a listing in the biometric data 418 that has a matching or similar source/capturing device 420. In other embodiments of the invention, the authentication module 310 is configured to heuristically apply/compare all of the relevant historical biometric data 418 (i.e., all biometric data of a same/similar type and source) to the biometric identifier(s) 316 to determine user authentication 318.

Figure 3:
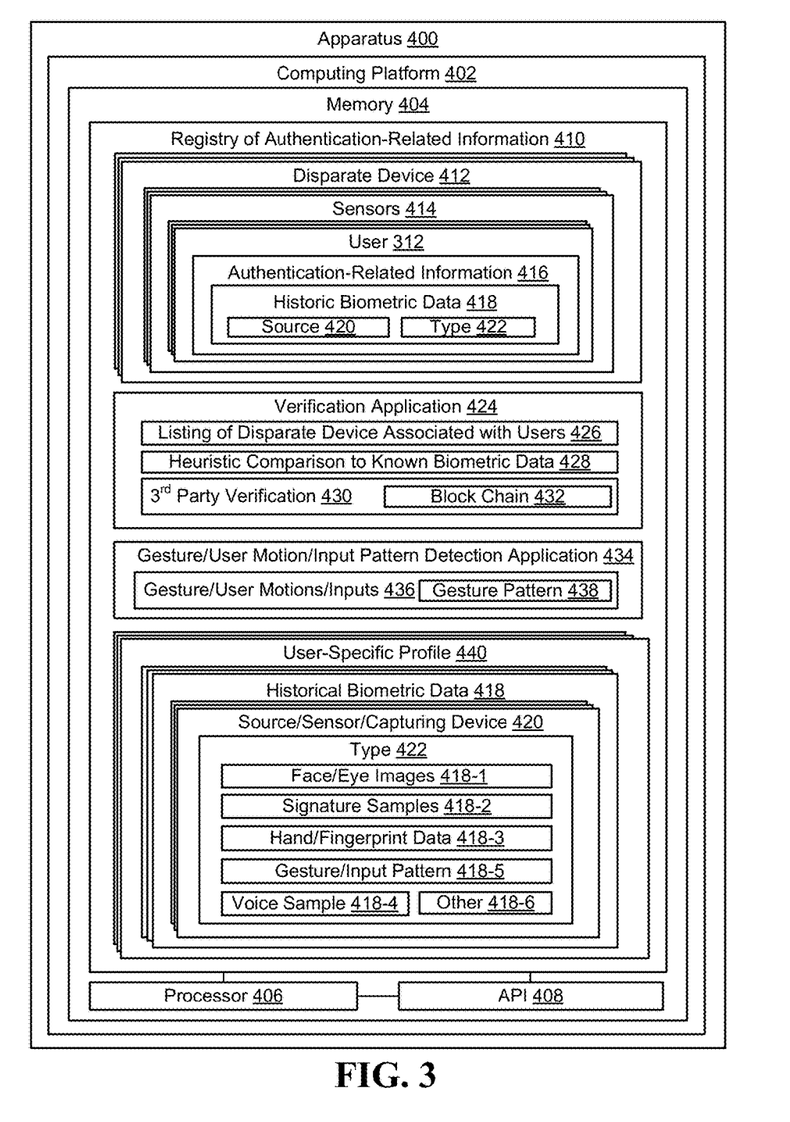
FIG. 3 provides a block diagram of an apparatus configured for forming and storing a registry of biometric authentication information, in accordance with embodiments of the present invention.

Referring to FIG. 3 a block diagram is presented of the apparatus 400, which is configured for creating a registry of authentication-related information, in accordance with embodiments of the present invention. In addition to providing greater detail, FIG. 3 highlights various alternate embodiments of the invention. The apparatus 400 may include one or more of any type of computing device, such as a server, or the like. The present apparatus and methods can accordingly be performed on any form of one or more computing devices.

The apparatus 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes processor 406, which may be an application-specific integrated circuit ("ASIC"), or other chipset, processor, logic circuit, or other data processing device. Processor 306 or other processor such as ASIC may execute an application programming interface ("API") 408 that interfaces with any resident programs, such as registry of authentication-related information 410 and routines, sub-modules associated therewith or the like stored in the memory 404 of the apparatus 400.

Processor 406 includes various processing subsystems (not shown in FIG. 3) embodied in hardware, firmware, software, and combinations thereof, that enable the functionality of apparatus 400 and the operability of the apparatus on a network. For example, processing subsystems allow for initiating and maintaining communications and exchanging data with other networked devices, such as those apparatus, databases and repositories shown in FIG. 1. For the disclosed aspects, processing subsystems of processor 406 may include any subsystem used in conjunction with registry of authentication-related information 410 and related algorithms, sub-algorithms, modules, sub-modules thereof.

Computer platform 402 may additionally include communications module (not shown in FIG. 2) embodied in hardware, firmware, software, and combinations thereof, that enables communications among the various components of the apparatus 400, as well as between the other networked devices. Thus, communication module may include the requisite hardware, firmware, software and/or combinations thereof for establishing and maintaining a network communication connection.

The memory 404 of apparatus 400 stores registry of authentication-related information 410, which is configured to generate and store authentication-related information, including historical biometric data, in accordance with embodiments of the present invention. In this regard, the registry 410 is configured to receive, on an ongoing basis, from a plurality of disparate devices 412, authentication-related information 416 associated with a plurality of users 312 including biometric data 418. As previously discussed in relation to FIG. 1, the disparate devices may include one or more sensors 414 for capturing biometric data. Moreover, once the biometric data is captured, the disparate devices are configured to automatically communicate, via the Internet, the biometric data to the registry 410. In this regard, the disparate devices are considered part of the overall network environment commonly referred to as the Internet of Things (IoT). The disparate devices 412 may be public devices, such as surveillance cameras, POS devices or the like, or the devices may personal devices associated with/belonging to the users 312, such as a mobile communication device or a device within the user's residence or the like. In specific embodiments the biometric data 418 communicated from the disparate devices 412 will not only indicate the type 422 of biometric data 416 (e.g., facial/eye image, signature, voice sample, user gesture, and the like) but also indicate the source of the biometric data (e.g. sensor, input mechanism or the like from which the biometric data was captured). The biometric data may be captured and received by the registry on a regularly scheduled basis (such as, daily, weekly, monthly or the like) or on a dynamic as-determined basis.

As previously discussed in certain embodiments of the invention, the users are required to register with a biometric authentication service, which authorizes the service to capture and store the users' biometric data.

In alternate embodiments of the invention, the registry of authentication-related information 410 may include a data verification module 424 configured to verify that the biometric data 418 is, in fact (i.e., verified), associated with a user. In those embodiments in which the user registers, the users may also register their personal disparate devices, so that the registry knows which user to associate with biometric data received from those disparate devices. In such embodiments the verification module 424 may rely on a listing 426 of disparate devices associated with the user to verify the biometric data 418. In other embodiments of the invention, such as when the disparate device 412 is a public device, the verification module 424 may be configured to verify data through heuristic comparison 428 of the biometric data 418 to known biometric data associated the user (i.e., previously verified data or the like).

In specific embodiments of the invention, in which the verification module is external to the registry 410 and conducted by a third-party entity (e.g., some entity other than the entity in control of the registry 410), the third-party verification 430 of the biometric date may result in a block chain 432. For more information on block chains 432, please refer to co-pending U.S. patent application Ser. No. 15/050,098, filed Feb. 22, 2016, entitled, "System for Tracking and Validation of Multiple Instances of an Entity in a Process Data Network" and Ser. No. 15/050,084, filed Feb. 22, 2016, entitled, "System for Tracking and Validation of an Entity in a Process Data Network" both of which are assigned to the same inventive entity as the present application and are herein incorporated by reference as if set forth fully herein.

In further specific embodiments of the invention, the registry 410 or some other ancillary module includes gesture/user motion/input pattern detection application 434, which is configured to determine that a plurality of gestures or user motions/inputs 436 provided by the user 312, which serve as biometric data 418 received by the registry 410, form a gesture/input pattern 438. Such identified gesture/input patterns are subsequently stored in the user-profile 434 and, as such, serves as authentication criteria, in the event the biometric identifier(s) comprise one of the identified gesture/input pattern(s).

The registry of authentication data 410 is further configured to store the historical biometric data 418 in a user-specific profile 434, which categorizes the biometric data 418 according to source/sensor/capturing device 420 and biometric data type 422. As previously noted the type 422 of biometric data 418 may include, but is not limited to, face/eye images 418-1, signature samples 418-2, handprint/fingerprint data 418-3, voice sample 418-4, gesture/input data/pattern 418-5, and any other known or future know biometric data.

To supplement the present disclosure, this application further incorporates entirely by reference the following commonly assigned patent applications:

| U.S. Patent Application Ser. No. | Title | Filed On |
|---|---|---|
| To be assigned | Resource Tag Generation and Deployment for Resource Valuation for Resource Distribution | Concurrently herewith |
| To be assigned | System for Real-Time Release of Allocated Resources Based on Device Stage | Concurrently herewith |
| To be assigned | Security Implementation for Resource Distribution | Concurrently herewith |
| To be assigned | Security Implementation for User Resource Distribution with Peripheral Device | Concurrently herewith |
| To be assigned | Intelligent Resource Procurement System Based on Physical Proximity to Related Resources | Concurrently herewith |
| To be assigned | System for Machine-Initiated Resource Generation and Customization | Concurrently herewith |
| To be assigned | Security Implementation for User Resource Distribution | Concurrently herewith |
| To be assigned | System for Adaption of Multiple Digital Signatures in a Distributed Network | Concurrently herewith |

Thus, systems, apparatus, methods, and computer program products described above provide for biometric authentication of users using current, updatable biometric data/standards. In this regard, the present invention provides for creation of a registry of authentication information that dynamically, over time, receives biometric authentication-related information (e.g., photographs, voice samples, fingerprints, signatures and the like) from diverse devices configured to capture/sense such. The devices may be devices associated with the user, such as mobile communication devices, devices locate in the user's residence or the like, or the devices may be public devices, such as security cameras, point-of-sale devices or the like, which are configured to capture and electronically communicate biometric authentication-related information. In response to invoking a biometric authentication application and receiving a user's biometric credentials/identifier, the registry is accessed so that a comparison may be made between the user's current biometric credentials and the biometric data stored within the registry. By relying on recently captured biometric data, the present invention is able to authenticate biometric credentials which may have changed over time or differ depending on form, such as input mechanism, sensor or the like. As such, more accurate biometric authentication is made possible and, in some instances, provides for biometric authentication in instances in which biometric authentication would otherwise be difficult, if not, impossible.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a user, the system comprising:
    a first computing platform having a first memory and at least one first processor in communication with the first memory;
    a registry of authentication-related information stored in the first memory and configured to implement the first processor to:
        receive, on an ongoing basis, from a plurality of devices having one or more sensors that capture biometric data, authentication-related information related to a plurality of users, wherein the authentication-related information includes biometric data associated with each of the users and an association of biometric data to a type of the device that captured the biometric data, and
        store the authentication-related information associated with each of the users in user-specific profiles, wherein the user-specific profiles form, over time, a historical record of each user's biometric data;
    a second computing platform having a second memory and at least one second processor in with the second communication memory; and
    an authentication module, stored in the second memory, executable by the second processor and configured to:
        receive, from a user, an authentication credential that comprises at least one biometric identifier of the user and identifies a type of one or more devices that captured the at least one biometric identifier, and
        access, electronically, a user-specific profile associated with the user, which is stored in the registry of authentication of data,
        compare the at least one biometric identifier to the biometric data in the user-specific profile, wherein the biometric data is compared to the at least one biometric identifier in chronological order starting with biometric data stored most recently in the user-specific profile and biometric data captured from a same or similar type of device that captured the at least one biometric identifier is compared first prior to comparing the biometric data captured from a different type of device that captured the at least one biometric identifier, and
        based on the comparison, determine that the user is authenticated.

2. The system of claim 1, wherein the types of biometric data include one or more of signature data, facial characteristic data, fingerprint or hand characteristic data, voice characteristic data.

3. The system of claim 1, further comprising a biometric pattern determination module stored in a third memory, executable by a third processor and configured to determine one or more patterns associated with the biometric data stored in a user profile within the registry of authentication information and store the one or more patterns in the user-specific profile with the registry.

4. The system of claim 3, wherein the authentication module is further configured to:
    receive, from the user, the authentication credential that comprises at least one biometric identifier of the user, wherein the biometric identifier defines a biometric pattern identifier, and
    compare the at least one biometric pattern identifier to the biometric data in the user-specific profile, wherein the comparison includes comparing the biometric pattern identifier to the one or more patterns stored in the user-specific profile.

5. The system of claim 1, further comprising a data verification module stored in third memory, executable by a third processor and configured to, in response to the registry receiving the authentication-related information, verify that the authentication-related information is related to one of the plurality of users.

6. The system of claim 5, wherein the biometric data verification module is further configured to verify that the authentication-related information is related to one of the plurality of users by at least one of (i) comparing a device from which the authentication-related information was received to a registering listing of one or more devices associated with the user, or (ii) heuristic comparison of the biometric data comprising the authentication-related information to known biometric data associated with the user.

7. The system of claim 5, wherein the registry of authentication is further configured to, upon verification by the verification module, store the verified authentication-related information as a block chain within the user-specific profile associated with the user.

8. The system of claim 1, wherein the authentication module is further configured to receive the authentication credential that comprises at least one biometric identifier of the user, in response to one of (i) a predetermined period of time has elapsed since the user has provided authentication credential for an application requiring authentication credentials in a form of a username and password, or (ii) misappropriation has recently occurred or is known to be associated with an application requiring authentication credentials.

9. An apparatus for authenticating a user, the apparatus comprising:
    a computer platform having a memory and at least one processor in communication with the memory; and
    an authentication module, stored in the memory, executable by the processor and configured to:
        receive, from a user, an authentication credential that comprises at least one biometric identifier of the user and identifies a type of one or more devices that captured the at least one biometric identifier,
        access, electronically, a registry of authentication of data that (i) receives, on an ongoing basis, from a plurality of devices having one or more sensors that capture biometric data, authentication-related information related to a plurality of users, wherein the authentication-related information includes biometric data associated with each of the users and an association of biometric data to a type of the device that captured the biometric data, and (ii) stores the authentication-related information associated with each of the users in user-specific profiles, wherein the user-specific profiles form, over time, a historical record of each user's biometric data categorized by the sources and the types of the biometric data;

compare the at least one biometric identifier to the biometric data in the user-specific profile, wherein the biometric data is compared to the at least one biometric identifier in chronological order starting with biometric data stored most recently in the user-specific profile and biometric data captured from a same or similar type of device that captured the at least one biometric identifier is compared first prior to comparing the biometric data captured from a different type of device that captured the at least one biometric identifier; and based on the comparison, determine that the user is authenticated.

10. The apparatus of claim 9, wherein the authentication module is further configured to compare the at least one biometric identifier to the biometric data in the user-specific profile in chronological order from a most recently received biometric data.

11. The apparatus of claim 9, wherein the authentication module is further configured to:

receive, from the user, the authentication credential that comprises at least one biometric identifier of the user, wherein the biometric identifier defines a biometric pattern identifier, and compare the at least one biometric pattern identifier to the biometric data in the user-specific profile, wherein the comparison includes comparing the biometric pattern identifier to the one or more determined patterns stored in the user-specific profile.

12. A computer program product including a non-transitory computer-readable medium, the computer-readable medium comprising:

a first set of codes for causing a computer to receive, on an ongoing basis, from a plurality of devices having one or more sensors that capture biometric data, authentication-related information related to a plurality of users, wherein the authentication-related information includes biometric data associated with each of the users and an association of biometric data to a type of the device that captured the biometric data;

a second set of codes for causing a computer to store the authentication-related information associated with each of the users in user-specific profiles, wherein the user-specific profiles form, over time, a historical record of each user's biometric data categorized by the sources and the types of the biometric data;

a third set of codes for causing a computer to receive, from a user, an authentication credential that comprises at least one biometric identifier of the user and identifies a type of one or more devices that captured the at least one biometric identifier; and a fourth set of codes for causing a computer to access, electronically, one of the user-specific profiles associated with the user to compare the at least one biometric identifier to the biometric data in the user-specific profile, wherein the biometric data is compared to the at least one biometric identifier in chronological order starting with biometric data stored most recently in the user-specific profile and biometric data captured from a same or similar type of device that captured the at least one biometric identifier is compared first prior to comparing the biometric data captured from a different type of device that captured the at least one biometric identifier, and, based on the comparison, determine that the user is authenticated.

13. The computer program product of claim 12, wherein the fourth set of codes is further configured to cause the computer to compare the at least one biometric identifier to the biometric data in the user-specific profile in chronological order from a most recently received biometric data.

14. The computer program product of claim 12, further comprising a fifth set of codes for causing a computer to determine one or more patterns associated with the biometric data stored in a user profile within the registry of authentication information and store the one or more patterns in the user-specific profile with the registry.

15. The computer program product of claim 14, wherein the third set of codes is further configured to cause the computer to receive, from the user, the authentication credential that comprises at least one biometric identifier of the user, wherein the biometric identifier defines a biometric pattern identifier, and wherein the fourth set of codes is further configured to cause the computer to compare the at least one biometric pattern identifier to the biometric data in the user-specific profile, wherein the comparison includes comparing the biometric pattern identifier to the one or more patterns stored in the user-specific profile.

16. The computer program product of claim 12, further comprising a fifth set of codes for causing a computer to, in response to the registry receiving the authentication-related information, verify that the authentication-related information is related to one of the plurality of users.

* * * * *